Nov. 27, 1945.  D. B. AVERY  2,389,752
SEMI-TRAILER STEERING MECHANISM
Filed Feb. 23, 1944  3 Sheets-Sheet 1

INVENTOR.
Dallas B. Avery
BY
ATTORNEY

Nov. 27, 1945.   D. B. AVERY   2,389,752
SEMI-TRAILER STEERING MECHANISM
Filed Feb. 23, 1944   3 Sheets-Sheet 2
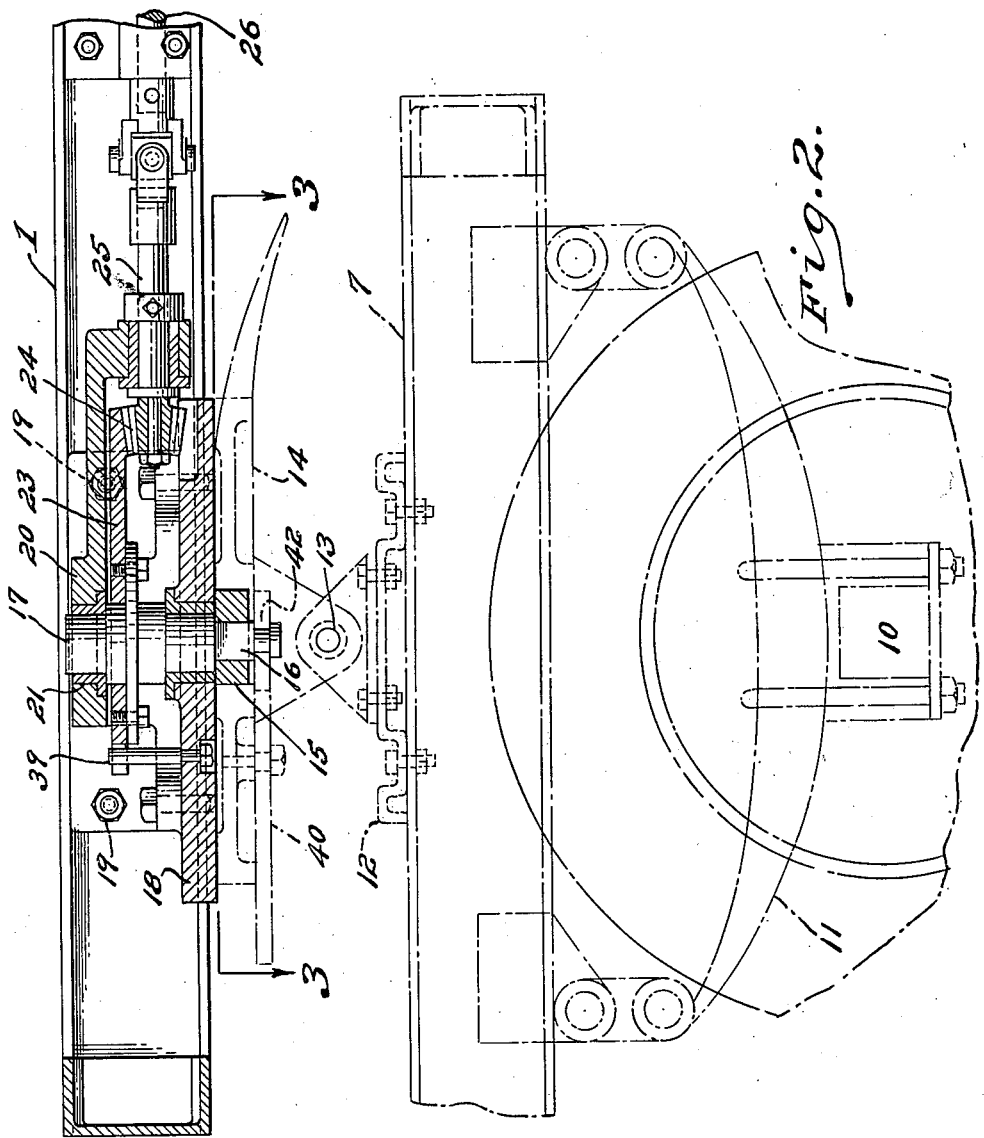
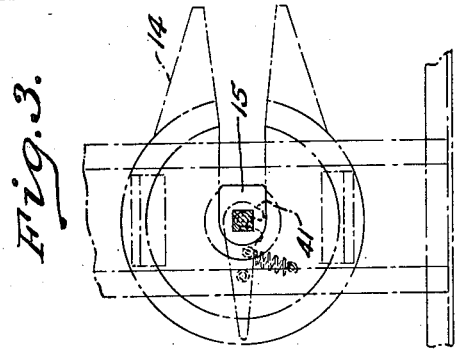
INVENTOR.
Dallas B. Avery
BY
ATTORNEY

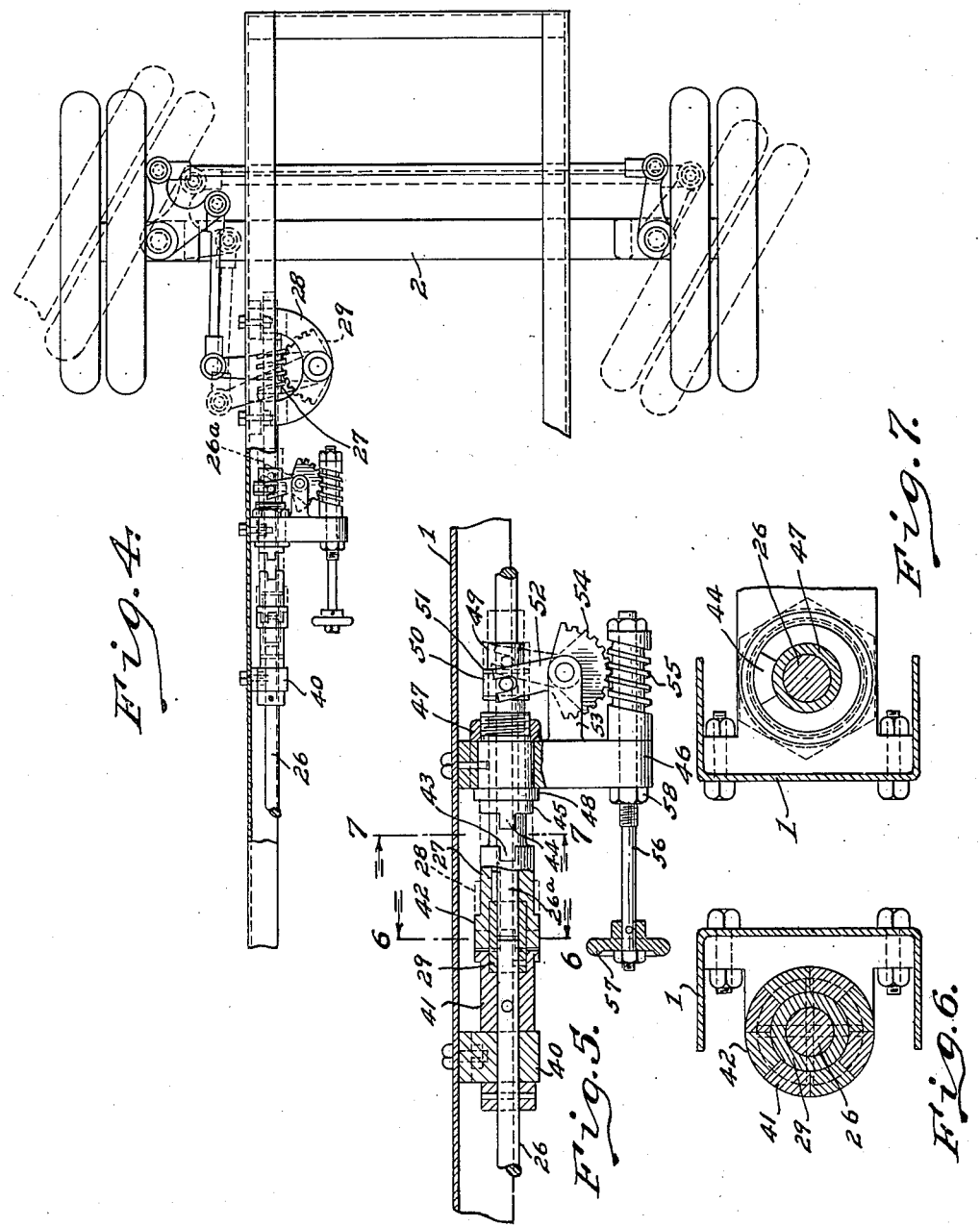

Patented Nov. 27, 1945

2,389,752

UNITED STATES PATENT OFFICE 2,389,752

SEMITRAILER STEERING MECHANISM

Dallas B. Avery, Capac, Mich.

Application February 23, 1944, Serial No. 523,781

2 Claims. (Cl. 280—33.5)

This invention relates to semi-trailer structures including a means with which the fifth wheel of a tractor element may be engaged or disengaged and mechanism between said means and the rear trailer wheels whereby the turning of the tractor frame and the rear wheels of the tractor associated therewith causes the trailer wheels to turn at an angle to the longitudinal axis of the trailer to cause the trailer wheels to follow the track of the rear tractor wheels.

A further feature of the invention is involved in the means provided for locking the trailer wheels to prevent turning thereon on their pivots by the turning of the tractor frame.

Commonly known semi-trailer structures have a pair of road wheels and axle connecting the same at the rear of the trailer frame and in use the forward end of the trailer frame has a supporting means for holding the forward end of the tractor frame at the proper position to permit the rear end of the tractor to be moved thereunder. In my improved steering mechanism the fifth wheel carried at the rear end of the tractor may be moved under the forward end of the trailer frame to engagement with an element forming part of the steering mechanism for the trailer all of which is hereinafter more fully described and claimed.

The preferred form of trailer steering mechanism and various structural features thereof involving my invention are hereinafter more fully described and claimed and a trailer and steering mechanism embodying my invention is shown in the accompanying drawings in which—

Fig. 2 is a vertical section on line 2—2 of Fig. 1 taken through the portion of the steering mechanism with which the usual fifth wheel of the tractor engages.

Fig. 3 is a section taken on line 3—3 of Fig. 2 showing the means for locking the fifth wheel of the tractor element with the steering mechanism.

Fig. 4 is a plan view of the mechanism utilizable to lock the rear trailer wheels from turning and to disconnect the mechanism actuated by the turning of the tractor frame to turn the rear trailer wheels on their pivots.

Fig. 5 is an enlarged plan view partly in horizontal section showing the disconnecting and locking mechanism.

Fig. 6 is a vertical section taken on line 6—6 of Fig. 5.

Fig. 7 is a vertical section taken on line 7—7 of Fig. 5.

Figure 1:
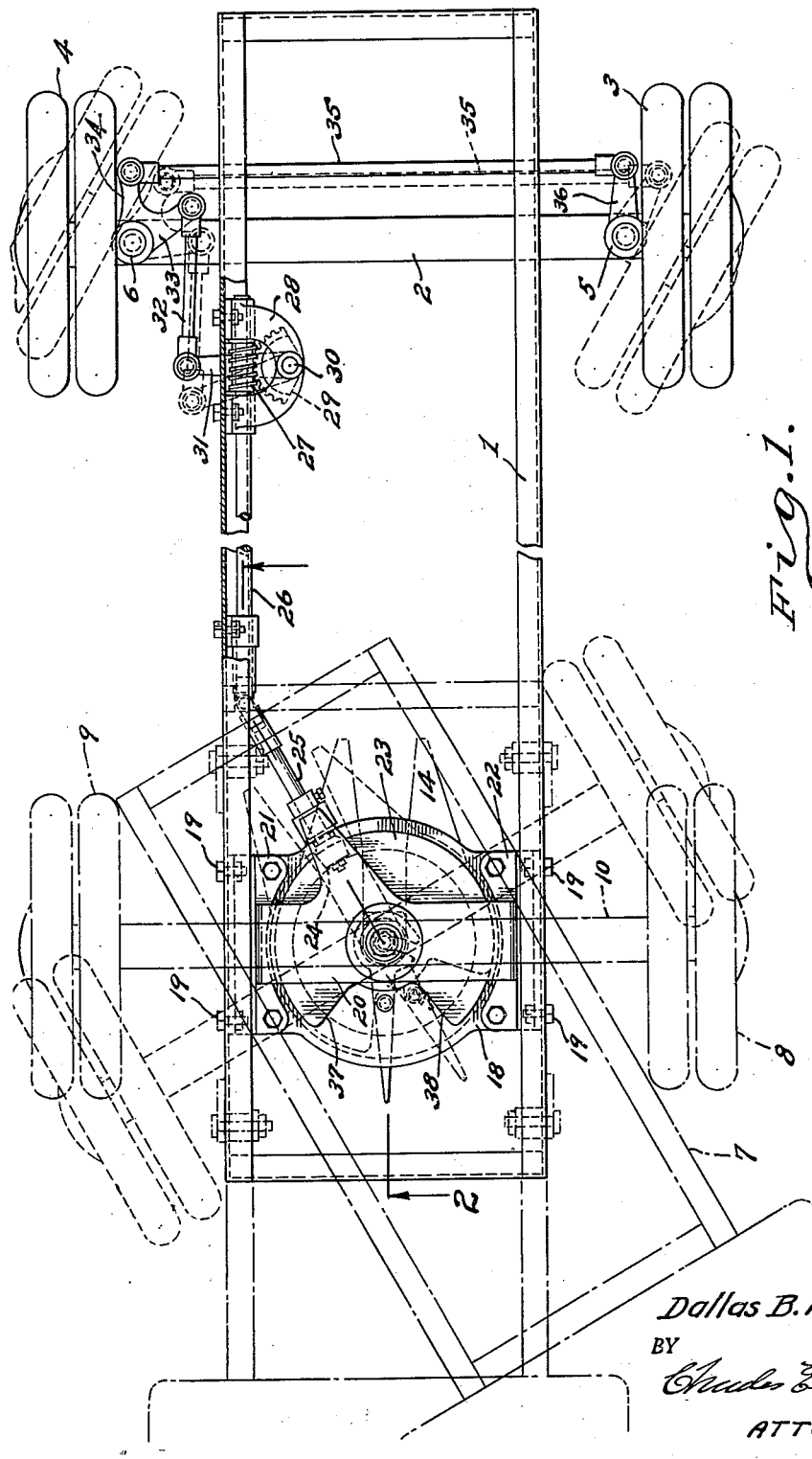
Fig. 1 is a plan view of my improved semi-trailer showing the steering mechanism and the relationship of the rear end of the tractor frame therewith.

In the preferred form of my invention as shown in Fig. 1, the frame of the semi-trailer is shown at 1 and the rear end thereof has an axle 2 fixed to the frame and wheel elements 3 and 4 are pivotally supported to the respective opposite ends of the axle 2 by the knuckles indicated at 5 and 6 which carry the spindles for the respective wheels in the manner usual with automobile steering wheels.

The rear end of the tractor frame 7, indicated by dotted lines in Figs. 1 and 2, is supported by wheels 8 and 9 on the axle 10 of the tractor as by means of the usual springs 11 as shown in Fig. 2. Directly above the axle 10 is mounted the commonly known fifth wheel structure having a base 12 supporting a horizontal pivot pin 13 to which the bifurcated plate 14 is pivotally supported in the usual manner. The slot in the plate 14, in the backing of the tractor and fifth wheel thereof under the forward end of the trailer frame 1, engages a block 15 on the squared portion 16 at the lower end of a vertical shaft 17.

The vertical shaft 17 is rotatably supported at its lower end by a base plate 18 attached to the trailer frame by bolts 19 passing through the flanged ends of the plate 18 into the trailer frame and to the plate 18 is secured a second transverse plate 20 having end portions 21 and 22 bolted to opposite ends of the plate 18 as shown.

The plate 20 intermediate its ends is spaced from the plate 18 and the two plates 18 and 20 have vertically aligned apertures to receive a shaft 17 in which the shaft is rotatably supported by bearing elements 21. Secured to this shaft 17 between the plates 18 and 20 is a beveled gear 23 which meshes with a pinion 24 on a shaft 25 extending at an angle to the longitudinal axis of the trailer frame and connected, as by means of a universal coupling, with the shaft 26 extending along and supported by a side frame of the trailer. The shaft 26 has a worm 27 adjacent its end and the said end of the shaft 26 is rotatably supported by bearings in a bracket element 28 attached to the frame.

The bracket 28 has a half-worm gear 29 supported to turn on a vertical shaft 30 supported by the bracket and to which shaft is connected a lever arm 31. To the free end of the lever 31, a rod 32 is pivotally connected at one end and the opposite end of the rod 32 is connected to an arm 33 secured to the spindle of the wheel 4 pivoted to turn on a vertical axis relative to the fixed axle 2.

A second arm 34 is fixed to the arm 33 and to the end of the arm 34 is pivoted the cross bar 35 which, at its opposite end, is connected to a lever 36 integrally connected with the knuckle 5. Thus movement of the arm 31 by the worm 27 and worm gear 29 causes the rear wheels to turn on their pivotal supports to an angle relative to the longitudinal axis of the trailer frame.

It will be realized from the foregoing that turning of the rear end of the tractor in a horizontal plane at an angle to the trailer frame by change in direction of movement of the tractor causes rotation of the shaft 17 and causes the rear trailer wheels to turn to approximately the same degree but the reverse of the angle to which the rear wheels 8 and 9 of the tractor are turned.

The gear 23 is a segmental gear and a space is provided between one side 37 of the said space and the side 38 thereof. In this space is provided an upwardly extending pin 39 secured to the base plate 18 as shown in Fig. 2 which limits the degree to which the gear tractor may turn relative to the trailer frame.

Preferably the parts are so arranged as to prevent the turning of the trailer wheels or the rear tractor wheels to an angle greater than approximately thirty degrees to the longitudinal axis of the trailer. It is to be noted that the rear trailer wheels are turned at the same angle to the longitudinal center line of the trailer as the tractor wheels but in the reverse direction so that the turning of the tractor wheels 8 and 9 to the position shown by dotted lines in Fig. 1 will turn the trailer wheels 3 and 4 in the opposite direction to cause the trailer wheels to follow the track of the tractor wheels.

The fifth wheel structure hereinbefore referred to is the commonly known structure now in use on tractors for use with semi-trailers and the tractor carrying the fifth wheel structure including a bifurcated plate 14 which, when in position shown in Figs. 2 and 3, comparatively closely engages the block 15 which is caused to turn with the turning of the rear end of the tractor and to thus rotate the shaft 17 which has a squared portion 16 fitting the block 15 as heretofore stated.

To lock the trailer frame to the fifth wheel I provide the usual lever 40 pivoted to the bifurcated plate as indicated by dotted lines in Figs. 2 and 3. The lever 40 has a hook end 41 to engage in the cylindrical groove 42 in the lower end of the shaft 17 as will be understood from Fig. 2 and the purpose of the lever 40 is to prevent vertical displacement of the forward end of the trailer frame 1 relative to the tractor.

It is desirable under certain conditions, as for instance in backing the trailer by the tractor into a desired position, to prevent the trailer wheels from turning on their vertical axes by the turning of the tractor frame. For this purpose the shaft 26, which is rotatable by the mechanism hereinbefore described, including the shaft 17, is formed of two parts 26 and 26a in end to end relation the shaft part 26 being supported adjacent its end by the bracket 40. On the end of the shaft 26 is secured one member 41 of a toothed clutch and on the contiguous end of the shaft part 26a is provided the companion member 42 of the clutch. The clutch member 42 is keyed to the shaft 26a as by a key 27 which rides in a slot indicated by the dotted lines 28 in the shaft end 26a. A collar 29 is pinned to the end of the shaft 26 and extends into the slidable clutch element 42 and serves to support the ends of the shaft elements 26 and 26a in longitudinal alignment. The clutch element 42 has a recess 43 which is engageable by a tooth 44 of the companion clutch element 45 held from longitudinal movement in a bracket 46 by means of a nut 47 which abuts one side of the bracket 46, the opposite side of the bracket being engaged by a flange 48. A sleeve 49 is slidable on the shaft 26 and is adapted to move the clutch element 42 in one direction to engagement with the one-tooth clutch 45 or in the opposite direction to engage the companion member 41 which is the position of the parts shown in Fig. 5. To move the clutch element 42 on the shaft 26a I provide a collar 50 which is rotatably supported on the sleeve 49 and held from longitudinal movement thereof by flanges 51.

To move the sleeve 49 and thus operate the clutch I provide a lever 52 pivoted to a supporting bracket 53 attached to the bracket 46. The arm 52 has a segmental gear 54 engaged by a worm 55 rotatable by means of a shaft 56 and hand wheel 57. By releasing the nut 58 on a threaded portion of the shaft 56 the handle and worm 55 may be turned to thereby turn the lever 52 and thus move the clutch member 42 in one direction or the other. When the parts are in the position shown in Fig. 5 rotation of the shaft 26 by means of the vertical shaft 17 shown in Fig. 2, turns the trailer wheels from a position at a right angle to the axle 2 as shown in full lines in Fig. 4 to an angular position shown by the dotted lines in Fig. 4. As has heretofore been described relative to Fig. 1 and for this latter operation the clutch parts 41 and 42 are in the relationship shown in Figs. 4 and 5 but if it be desired to hold the rear wheels from turning on their vertical pivots, the hand wheel 57 and the worm 55 are turned to move the sleeve 49 and clutch member 42 on the shaft 26a to cause engagement between the tooth 44 and notch 43 of the clutch. As the clutch member 44 is held from rotation and as the clutch elements 41 and 42 are disengaged, the rotation of the shaft 26a is prevented and the wheels are locked in the full line position shown in Fig. 4. This is due to the fact that the clutch element 42 is keyed to the shaft 26a and it is also held from revolution by engagement of the recess 43 by the tooth 44 which is also held from rotation.

It is thus to be seen that, by the mechanism described and shown in Figs. 4 to 7 inclusive, the trailer wheels may be made to turn on their vertical axes by the turning of the tractor frame and shaft 17 as is required for ordinary use wherein it is desired that the trailer wheels may track with the rear wheels of the tractor and, whenever it is desired to prevent the turning of the trailer wheels by turning of the tractor frame relative to the trailer frame, the trailer wheels may be locked to occupy a plane parallel with the trailer frame.

From the foregoing description it is believed evident that the parts as described and arranged as shown provide a structure well adapted for the purpose described and that the various features and objects of the invention are attained by the particular arrangement and functional relationship of the parts as hereinbefore described which provide for turning the trailer wheels at a sharp angle to the trailer or may be held from turning on their axes as occasion may require.

It is also to be observed that various changes may be made in the structure and specific arrangement of parts within the spirit and scope of the appended claims.

Having thus fully described my invention, its utility and mode of operation, what I claim and desire to secure by Letters Patent of the United States is:

1. Semi-trailer steering mechanism for association with a trailer frame having an axle extending transversely of and fixed to the rear end of the frame, and wheel elements supported at opposite ends of the axle to turn on a vertical axis comprising a plate supported at the forward end of the trailer frame, a vertical shaft rotatably supported by the plate and having an end portion projecting below the said plate, means on the lower end of the shaft engageable by means carried by the tractor element whereby the turning of the tractor element in a horizontal plane causes rotation of the shaft, a gear fixed to the shaft, a pinion engageable therewith, a shaft for the said pinion, and rotatable means associated with the shaft whereby rotation of the shaft in one direction or the other causes the rear wheels to turn on their pivots to position the trailer wheels at an angle to the longitudinal center line of the trailer frame approximately equal to and the reverse of the angle to which the tractor may be turned.

2. Semi-trailer steering mechanism for association with a trailer frame having a transverse axle at its rear end and wheel elements supported at opposite ends of the axle to turn on a vertical axis, comprising a vertical shaft, a support for the shaft at the forward end of the trailer frame, said shaft extending to below the plane of the trailer frame, means on the lower end of the shaft adapted for engagement with the fifth wheel element of a tractor whereby the turning of the tractor in a horizontal plane turns the shaft, a beveled gear fixed to the shaft, a pinion supported in engagement with the gear, a shaft for the pinion, and means between the pinion shaft and the trailer wheels whereby rotation of the shaft in one direction or the other turns the trailer wheels on their pivots to the same degree and the reverse of the angle to which the tractor frame may be turned relative to the trailer frame.

DALLAS B. AVERY.